US008571071B2

(12) United States Patent
Dominguez Romero et al.

(10) Patent No.: US 8,571,071 B2
(45) Date of Patent: Oct. 29, 2013

(54) METHOD AND RADIO BASE STATION FOR SCHEDULING TRAFFIC IN WIDE AREA CELLULAR TELEPHONE NETWORKS

(75) Inventors: Francisco Javier Dominguez Romero, Madrid (ES); Beatriz Garriga Muñiz, Madrid (ES); Clara Serrano Solsona, Madrid (ES)

(73) Assignee: Vodafone Group PLC, Newbury, Berkshire (GB)

( * ) Notice: Subject to any disclaimer, the term of this patent is extended or adjusted under 35 U.S.C. 154(b) by 430 days.

(21) Appl. No.: 12/642,644

(22) Filed: Dec. 18, 2009

(65) Prior Publication Data

US 2010/0215000 A1    Aug. 26, 2010

(30) Foreign Application Priority Data

Dec. 18, 2008  (ES) .................................. 200803606

(51) Int. Cl.
*H04J 3/06*    (2006.01)
(52) U.S. Cl.
USPC .......................................... 370/508; 370/235
(58) Field of Classification Search
USPC .......................................... 370/235, 508, 464
See application file for complete search history.

(56) References Cited

U.S. PATENT DOCUMENTS

| | | | | | |
|---|---|---|---|---|---|
| 5,570,348 | A | * | 10/1996 | Holden | 370/236 |
| 7,474,627 | B2 | * | 1/2009 | Chheda et al. | 370/252 |
| 2006/0256803 | A1 | * | 11/2006 | Nakata et al. | 370/412 |
| 2009/0092083 | A1 | * | 4/2009 | Shagdar et al. | 370/328 |

FOREIGN PATENT DOCUMENTS

EP    1318632 A2    6/2003

OTHER PUBLICATIONS

Espana Search Report dated Dec. 18, 2008 for 200803606.
Ohyun Jo et al. Enhanced Packet Scheduling Algorithm Providing QoS in High Speed Downlink Packet Access. Vehicular Technology Conference, 2006. VTC-2006 Fall. 2006 IEEE 64th. ISBN: 1-4244-0062-7. DOI: 10.1109/VTCF.2006.526.

* cited by examiner

*Primary Examiner* — Phuc Tran
(74) *Attorney, Agent, or Firm* — Workman Nydegger

(57) ABSTRACT

A method for scheduling traffic in wide area cellular telephone networks supporting the High-Speed Downlink Packet Access. The traffic contains packets related to users that are buffered in priority queues according to a value (i) which indicates a priority for transmission assigned to an incoming packet. The method includes determining a delay $t_d$ of the incoming packet. The method also includes calculating at a current scheduling time t at least one value of a scheduling priority SchedP(i,t) where scheduling priority SchedP(i,t) is a function of the value (i) indicating the priority of the incoming packet and the delay $t_d$ of the incoming packet. The further includes scheduling the packets buffered in the priority queues according to the values of the scheduling priority SchedP(i,t), and repeating the method every transmission time interval.

19 Claims, 4 Drawing Sheets

US 8,571,071 B2

METHOD AND RADIO BASE STATION FOR SCHEDULING TRAFFIC IN WIDE AREA CELLULAR TELEPHONE NETWORKS

CROSS-REFERENCES AND RELATED APPLICATIONS

This application claims the benefit of the Spanish Patent Application No. ES 200803606, filed on Dec. 18, 2008, which is hereby incorporated by reference in its entirety.

FIELD OF THE INVENTION

Embodiments of the present invention relate to the telecommunications sector and, more specifically, in the industrial area engaged in providing radio access networks (e.g., UTRAN in UMTS) with elements of cellular infrastructures such as base stations (e.g., Nodes-B in UMTS) for wide area cellular telephone networks (i.e. 3G networks).

More particularly, example embodiments described herein relate to methods and base station for scheduling traffic with different QoS and delay requirements in 3G networks supporting the High-Speed Downlink Packet Access (HSDPA).

BACKGROUND

UTRAN (UMTS Terrestrial Radio Access Network) is a collective term which includes the Radio Network Controller (RNC), the 3G radio base stations (Nodes-B) and the air interface to the User Equipment (UE). More particularly, Node-B handles radio channels, including the multiplexing/demultiplexing of user traffic (voice and data information).

Traffic scheduling is needed when a plurality of users has physical resources allocated onto a specific shared channel, as in the High-Speed Downlink Packet Access (HSDPA). Typically, the High Speed-Downlink Shared Channel (HS-DSCH) is used as transport channel by the User Equipment (UE) for receiving and by Node-B for transmitting data packets.

In the standard protocol HSDPA, scheduling strategies and packet schedulers are widely known. For HSDPA, the packet scheduler is located at the MAC-hs sub-layer of OSI layer 2 on the UTRAN side, in accordance to the technical specification 3GPP TS 25.321 "Medium Access Protocol (MAC) Specification (Release 5)".

FIG. 1 shows the MAC-hs model specified by 3GPP TS 25.321 v5.13.0 for traffic handling in a 3G base station (Node-B). The MAC-d flows (1) consist of traffic on a transport channel dedicated to a specific UE, containing packets with one or several priorities. These packets are buffered by the MAC-hs entity (2) in the Node-B using a priority queue distribution entity (3). There exists a scheduling/priority handling routine that select which priority queue (4) can transmit the traffic, belonging to a user or multiple users, at a certain transmission time interval —TTI-; in HSDPA, the typical value of TTI is 2 milliseconds. Various selections can be done at every 2 ms i.e., every TTI or scheduling instant, generally speaking The selected priority queue (4) has resources allocated for transmission by a Hybrid Automatic repeat Request—HARQ- entity (5), which supports one or more HARQ process per HS-DSCH per TTI for storage of the scheduled packet to be transmitted or retransmitted. A Transport Format and Resource Combination —TFRC- selection routine (6) determines how much physical resources must be allocated for each packet to be transmitted on HS-DSCH (7). MAC control processes (8) and associated signalling in uplink and downlink (9, 9') are also involved for exchanging information between layer 2 and physical layer.

The 3G specifications provide traffic with different Quality of Service (QoS). The attributes of QoS are mapped onto the transport format and the priority parameters of the transport channels. A Scheduling Priority Indicator (SPI) is sent to the Node-B together with the corresponding payload within every data packet. The SPI consists of 4 bits; hence, 16 different priorities can be distinguished. Although the Node B Application Part (NBAP) standard (3GPP TS 25.433) specifies these priorities, it is vendor-specific how the different priorities are handled by the Node-B.

On the other hand, the UE feeds back a channel quality indicator (CQI) report to provide the base station scheduler with channel-state information.

Within the 3G networks, the HSDPA uses a scheduler in the Node-B that has to be optimised to differentiate traffic/users to provide the appropriate Quality of Service to everyone. Most of the algorithms for HSDPA scheduler are based on throughput measurements. Several HSDPA scheduling strategies are also based on delay but with complicated functions which are difficult to implement in the infrastructures of the current 3G networks. The algorithm used in the current HSDPA networks is the weighted proportional fair, wherein the scheduling priority (SchedP) of a user is calculated by equation 1:

$$SchedP = \frac{R(t)}{r(t)} * SPIweight \qquad \text{(equation 1)}$$

In equation 1, R(t) is the instant rate of the UE that can be reached according to the reported CQI at the scheduling time t, r(t) is the user scheduling rate in the last T seconds and SPIweight is the weight of the user taking into account its priority. The user scheduling rate r(t) is representing the throughput in the Node-B.

Normally, the SPIweight is a relative weight between different users, therefore a determined fix value is given to every SPI parameter (there are a maximum of 16 different SPI values) and these 16 possible SPIweight values are defined in the 3GPP standards.

The HSDPA scheduler calculates the different scheduling priorities (SchedP) of the packets every tti, i.e., every 2 ms, taking into account the different inputs, and then the HSDPA channel is allocated to the packet with the highest scheduling priority (SchedP). This scheduling priority (SchedP) is a fixed value, independent from the packet delay. If the HSDPA dedicated transport channel allows more than one packet per tti, then the next packet to be transmitted is chosen from the packets with a higher priority value buffered in the corresponding priority queue.

However, there are several kinds of applications/users that need different QoS priorities, not only in terms of throughput but also in terms of delay. Furthermore, simplification of algorithms is desirable. Therefore, the HSDPA scheduling optimization requires for considering the packet delays in the calculation of the scheduling priorities as well as simplifying said calculation.

SUMMARY OF EXAMPLE EMBODIMENTS

Embodiments of the present invention address at least some of the problems in the prior art by calculating different scheduling priorities (SchedP) of the packets every TTI, in a High-Speed Downlink Packet Access (HSDPA) scheduler, dynamically and taking into account the packet delay, instead of using a fixed scheduling priority value whichever the packet delay. Among other advantages, this allows a more efficient control of the delay of the traffic involved in the different applications in the 3G networks when going through the HSDPA scheduler and also guarantees the best Quality of Service (QoS) to the customers.

One embodiment refers to a method for scheduling traffic in 3G networks supporting HSDPA, comprising the following steps which are performed every TTI:

a) Determining or calculating a delay $t_d$ of the incoming packet.

b) Calculating at a current scheduling time t at least one value of a scheduling priority SchedP(i,t) which is a function of:

the value i indicating the priority of the incoming packet, which is buffered in the priority queue i the delay $t_d$ of transmission of the buffered packet.

c) Using the calculated values of the scheduling priorities to schedule the packets buffered in priority queues. Thus, the packets buffered in the queue i are scheduled, at the current scheduling time t, according to SchedP(i,t).

The method for scheduling further comprises the configuration or definition of a series (defined for each priority value i) of time instants: $T_1(i), T_2(i), \ldots, T_N(i)$, being N≥1 and $T_N(i) > \ldots > T_2(i) > T_1(i) > 0$. The values $T_1(i)$ and $T_N(i)$ can be configured to define respectively a minimum acceptable delay and a maximum acceptable delay for the incoming packet with priority indicated by the value i.

With these N defined time instants, N+1 values of the scheduling priority SchedP(i,t) can be calculated using a respective weight value (SPIweight$_1$(i), SPIweight$_2$(i), . . . , SPIweight$_N$(i), SPIweight$_{N+1}$(i),) which indicates a relative priority between users. The weight values are configured in the following association with the delay $t_d$:

If $T_1(i) > t_d > 0$, SPIweight$_1$(i) is used for calculating SchedP$_1$(i,t);

If $T_2(i) > t_d \geq T_1(i)$, SPIweight$_2$(i) is used for calculating SchedP$_2$(i,t); . . .

If $T_N(i) > t_d \geq T_{N+1}(i)$, SPIweight$_N$(i) is used for calculating SchedP$_N$(i,t);

If $t_d \geq T_N(i)$, SPIweight$_{N+1}$(i) is used for calculating SchedP$_{N+1}$(i,t).

The time instants and the weight values are fully configurable by the Operator at a HSDPA scheduler. Preferably, the packets are scheduled in an order from higher to lower values of the scheduling priority SchedP(i,t).

Another embodiment deals with a third generation (3G) base station (Node-B) which comprises a HSDPA scheduler implementing the method described above.

DESCRIPTION OF THE DRAWINGS

To complete the description that is being made and with the object of assisting in a better understanding of the characteristics of the invention, in accordance with a preferred example of practical embodiment thereof, accompanying said description as an integral part thereof, is a set of drawings wherein, by way of illustration and not restrictively, the following has been represented.

DETAILED DESCRIPTION OF EXAMPLE EMBODIMENTS

Embodiments of the present invention propose a scheduler of traffic in a base station (Node-B) operating in accordance with the 3GPP standards on the HSDPA systems.

Figure 1:
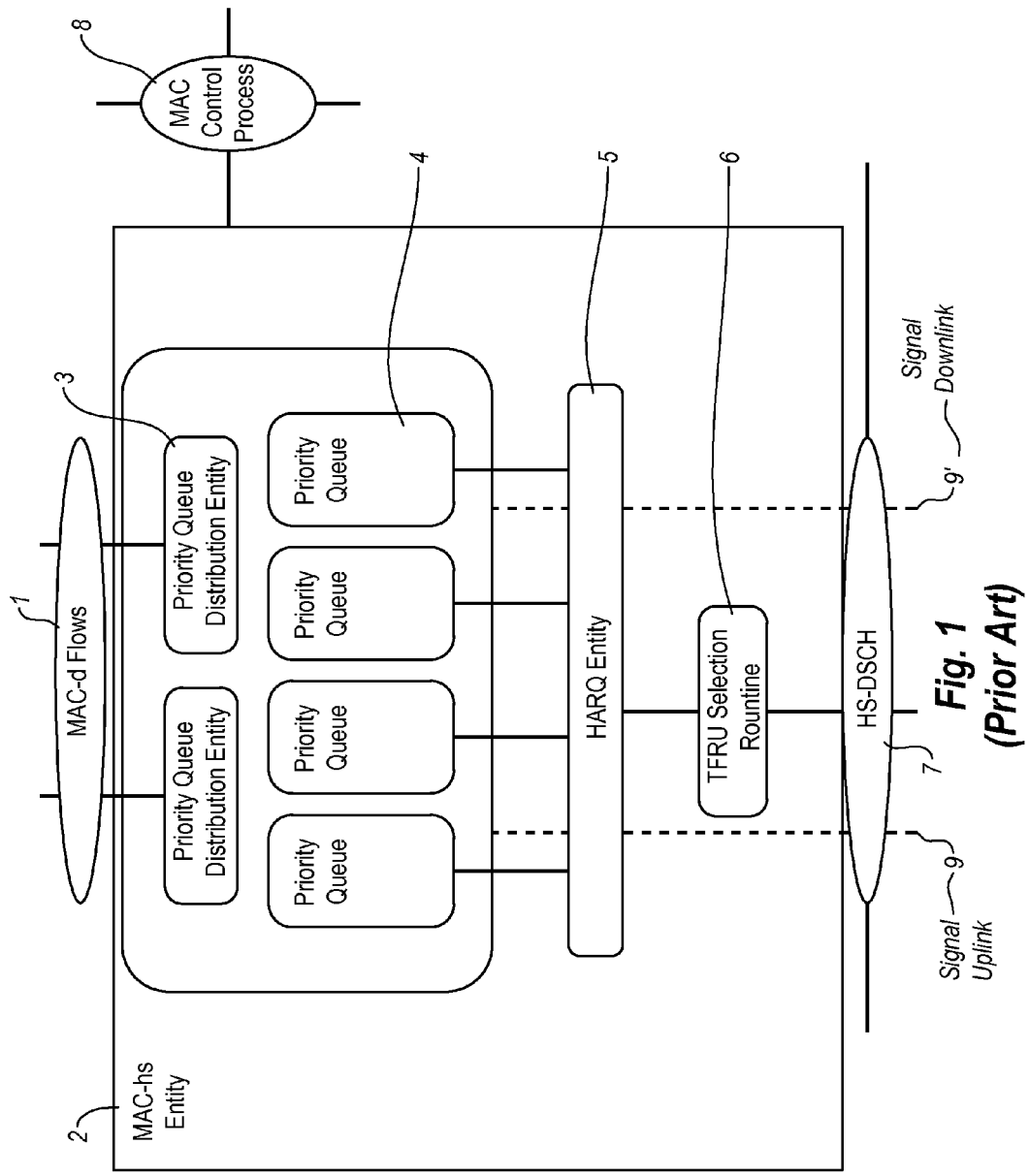
FIG. 1 shows the UTRAN side MAC-hs entity standardized in the state of the art for the scheduling implementation.
Figure 2:
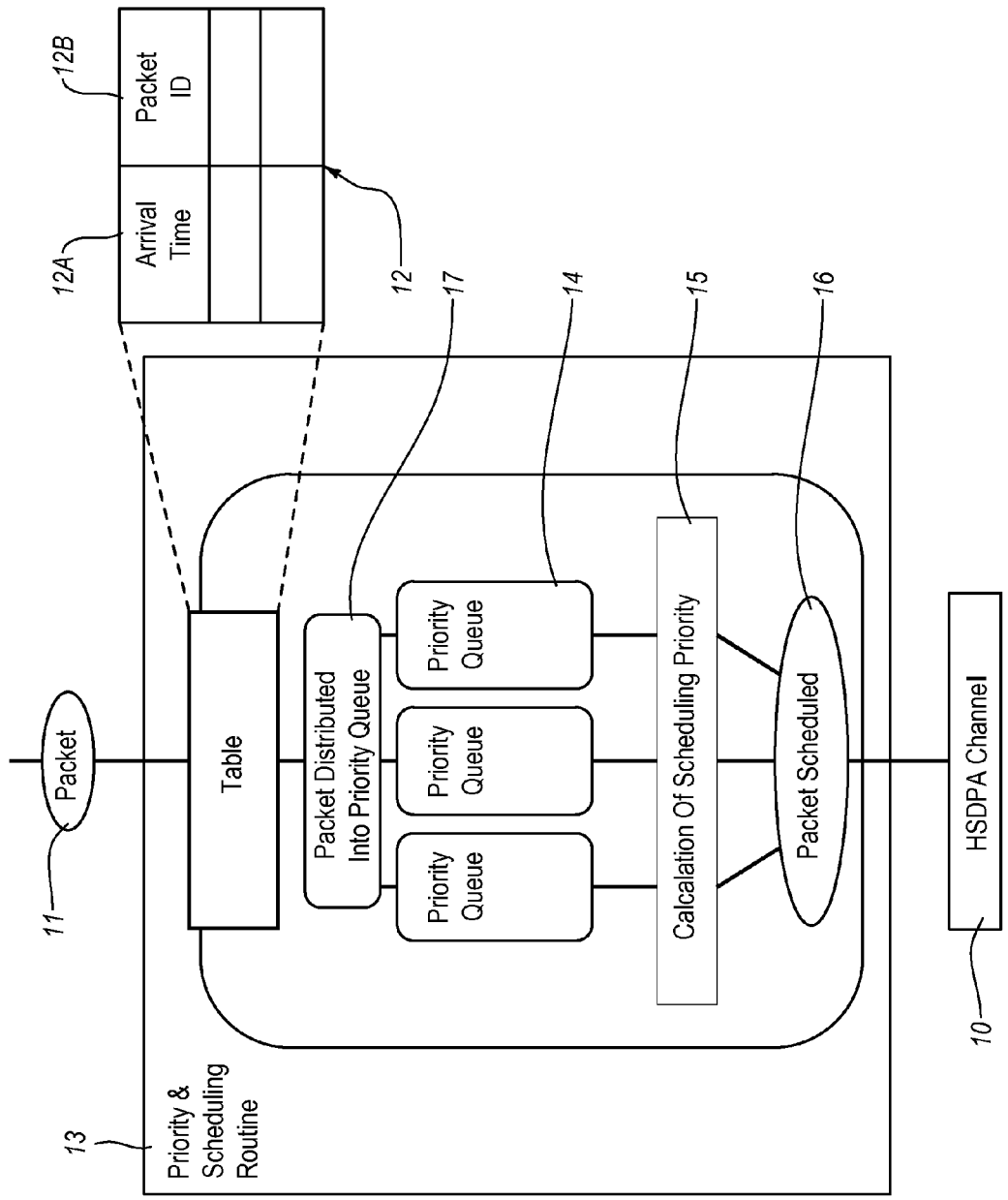
FIG. 2 shows the UTRAN side MAC-hs entity in accordance to a preferred embodiment of the invention.

FIG. 2 shows the functional entities of the MAC-hs layer, which is responsible for the management of the physical resources allocated to HSDPA and for handling the data transmitted on a HSDPA channel (10), for instance, the HS-DSCH. In accordance to a possible implementation of the invention, when an incoming packet arrives (11) to the 3G base station (Node-B), the packet is stamped with its arrival time, for example, storing in a table (12) the arrival time (12A) and referencing it to a Packet ID (12B) that identifies the incoming packet, e.g., the Transmission Sequence Number—TSN- provided in the parameters of the MAC header, as standardized in 3GPP TS 25.321 v8.3.0 for the HS-DSCH channel. As known in prior art, a scheduling and priority handling routine (13) distributes the incoming packets into different priority queues (14) depending on the value (i) of the scheduling priority indicator—SPI-. The SPI is assigned to the packet in correspondence to the Quality of Service—QoS- required and is defined by the 3GPP standards.

The scheduling and priority handling routine (13) of the base station (Node-B) performs at each transmission time interval—TTI- a calculation (15) of at least one value of a scheduling priority SchedP(i) which depends on the SPI value (i) and the delay of the incoming packet. Thus, this scheduling and priority handling routine (13) uses the arrival time that corresponds to the packet to calculate the packet delay of the packets stored in the priority queues (14). The incoming packets are distributed (17) into one of the priority queues (14) according to the SPI value (i). There can be up to M=N+1 possible values for the scheduling priority SchedP(i) corresponding to the SPI value (i). The value of the scheduling priority SchedP(i) is calculated using a weight SPIweight(i) whose value changes depending on the calculated packet delay and replacing the fixed SPIweight parameter in equation 1 by this SPIweight(i) variable on the packet delay and the SPI value (i) basis; i.e., $$SchedP_j(i,t) = \frac{R_i(t)}{r_i(t)} * SPIweight_j(i) \qquad \text{(equation 2)}$$

being t the current scheduling time measured in the scheduler of the base station (Node-B), i=0, 1, 2, . . . , 15, the 16 possible values of SPI specified in the 3GPP standards;

and j=1, 2, . . . , N+1.

The preferred value of N is 3 because it provides enough flexibility to apply to the different kind of users/applications and at the same time, it is easy to implement. A very high N, and then M, results in a more complex approach in terms of parameterization, testing and implementation.

The value of the SPIweight (i) taking into account the delay of the packets at the scheduler is fully configurable by the operator. For the case of N=3, three possible values for the SPIweight (i) associated to the SPI value (i) can be defined in this way:

SPIweight$_1$(i) if 0<packetDelay<T$_1$(i)
SPIweight$_2$(i) if T$_1$(i)≤packetDelay<T$_2$(i)
SPIweight$_3$(i) if T$_2$(i)≤packetDelay<T$_3$(i)
SPIweight$_4$(i) if T$_3$(I)≤packetDelay T$_j$(i) are defined in milliseconds (ms). In the example, j=1, 2, 3.

SPIweight$_1$(i) indicates the default SPI weight of the user. This value is maintained till delay is higher than T$_1$(i). Exceeded T$_1$(i), which defines a minimum acceptable delay, the SPI weight of the user changes to SPIweight$_2$(i) to provide the user with a higher weighting factor, i.e., higher priority. T$_3$(i) is useful to define a maximum acceptable delay. If the maximum acceptable delay is reached or surpassed, i.e., T$_3$(i)≤ packetDelay, the priority of the user increases to the highest value, i.e., the highest priority is assigned to this user with respect to the others.

For example, the recommended values for T$_j$(i) with N=3 and i=0, 1, 2 are given in milliseconds in the Table 1:

TABLE 1

|  | T$_1$(i) | T$_2$(i) | T$_3$(i) |
|---|---|---|---|
| I = 0 | 0, 1 | 1 | 5 |
| I = 1 | 5 | 10 | 30 |
| I = 2 | 30 | 50 | 70 |

Figure 3:
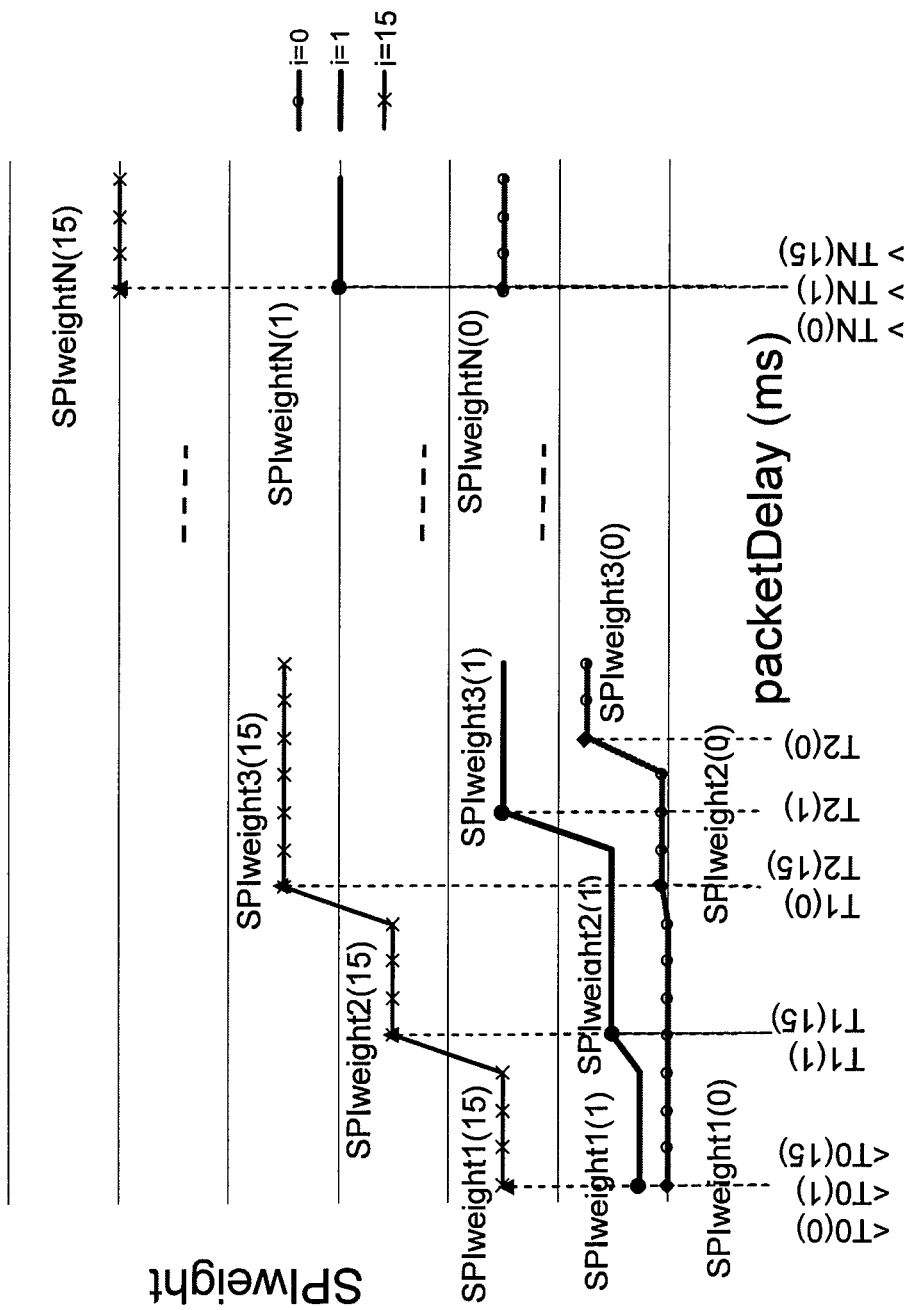
FIG. 3 shows a a graphical representation of the variable SPIweight (i) versus the packet delay.

FIG. 3 shows a graphical example of the variation of the SPIweight (i), which can be translated to the evolution of SchedP(i), versus the packetDelay.

Using the SPIweight (i) corresponding to the calculated delay and the assigned SPI value (i) of each packet, the respective values of the scheduling priority SchedP(i) are calculated for the current scheduling time applying the equation 2 and the buffered packets are scheduled (16) in order, from higher to lower values of the scheduling priority SchedP(i).

Note that SPIweight (i) are integers, SPIweight (i)≥0, and SchedP(i) can be higher than the unity, SchedP(i)≥0.

These steps of the scheduling and priority handling routine (13) are repeated every TTI; typically, TTI=2 ms.

Figure 4:
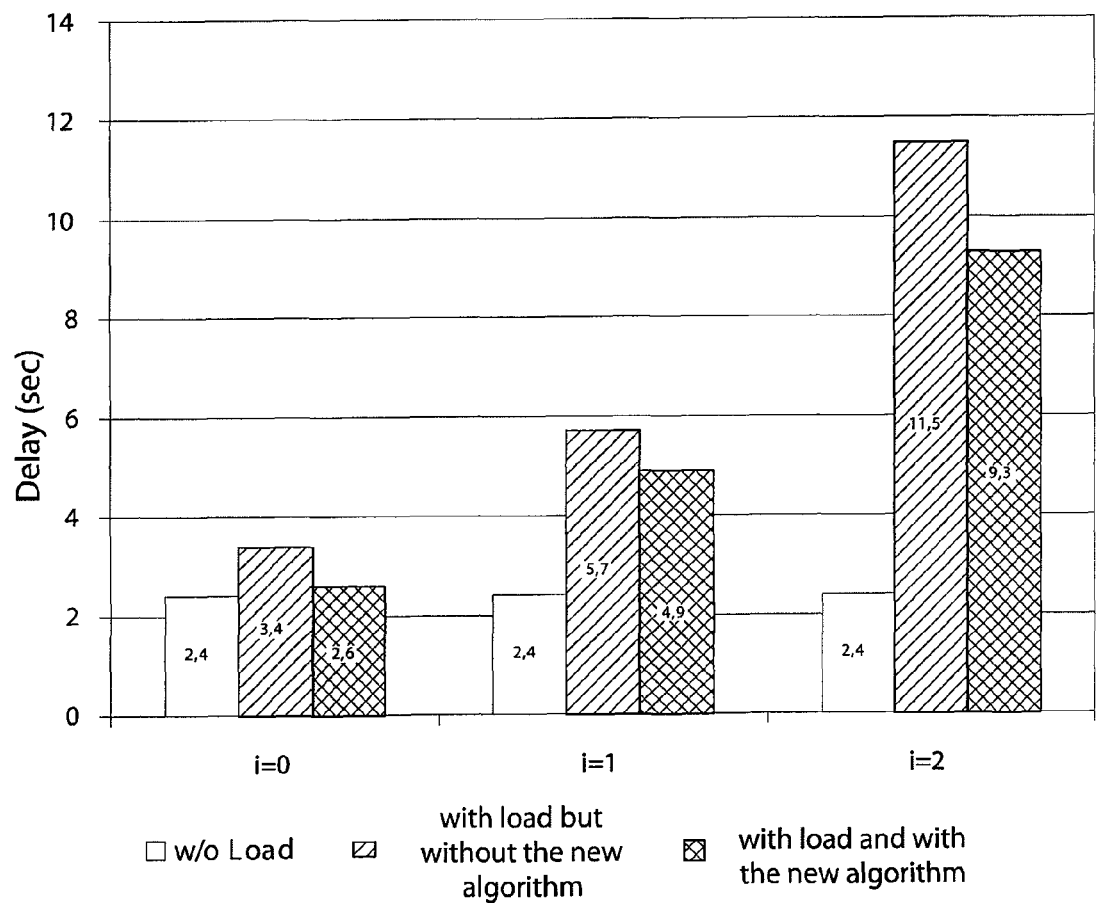
FIG. 4 shows a histogram comparing the delay of packets measured in three real network scenarios and considering three levels of QoS.

FIG. 4 shows a graphical representation of a delay comparison for the scheduling of a packet of a typical web page download service assuming three possible levels of QoS; this means three different SPI values: i=0, 1 and 2, from left to right in the FIG. 2. The plotted values result from real network testing and forecast estimations of three situations or cases represented by histogram bars:

I. Without load case: histogram bars in white.
   In this situation, the scheduler is not loaded, there are enough resources for the three QoS or priority levels. The delay experimented for packets of any priority, i=0, i=1 and i=2, is the same and equal to the minimum delay in the network for this web page.
   Another situation is when the scheduler is loaded:
   With load case: There aren't enough resources for the three required QoS. The three priority levels i=0, i=1 and i=2 are competing for resources. The delay suffered by the packets when delivered increases. But QoS Load differentiation provide high priority values I, prio(i=0)>prio(i=1)>prio(i=2), with a better performance in terms of delay.
   Two Cases can be distinguished in this situation of load:
II. Applying QoS Load differentiation without using the proposed scheduling routine: histogram bars in light grey.
III. Applying QoS Load differentiation using the scheduling routine proposed: histogram bars in dark grey.
   The delay of the packet decreases because has been scheduled earlier, that is, the packet has higher SchedP. The scheduling routine has increased the SPI weight of the packet using the SPIweight (i) corresponding to the calculated delay and the assigned SPI value (i) of each packet.

The terms in which this specification has been worded are always to be taken in the broadest sense and not restrictively.

Note that in this text, the term "comprises" and its derivations (such as "comprising", etc.) should not be understood in an excluding sense, that is, these terms should not be interpreted as excluding the possibility that what is described and defined may include further elements, steps, etc.

The invention claimed is:

1. A method for scheduling traffic in wide area cellular telephone networks, wherein traffic containing packets related to users is buffered in priority queues according to a value (i) which indicates a priority for transmission assigned to an incoming packet, the method comprising:
   a) determining a delay t$_d$ of the incoming packet, wherein the delay t$_d$ of the incoming packet is calculated using an arrival time of the incoming packet at a base station and a current scheduling time t, the arrival time being associated with an ID for the incoming packet and being used to dynamically create a table of arrival times;
   b) calculating at a current scheduling time t at least one value of a scheduling priority SchedP(i,t), the scheduling priority SchedP(i,t) being a function of the value (i) indicating the priority of the incoming packet and the delay t$_d$ of the incoming packet;
   c) scheduling the packets buffered in priority queues according to the values of the scheduling priority SchedP(i,t), and
   wherein the steps a), b) and c) are performed every transmission time interval.

2. The method according to claim 1, further comprising: defining N≥1 time instants (T$_1$(i), T$_2$(i), . . . , T$_N$(i)) for each value (i) indicating the priority of the incoming packet, wherein T$_N$(i)> . . . >T$_2$(i)>T$_1$(i)>0, being T$_1$(i) a minimum acceptable delay and T$_N$(i) a maximum acceptable delay for the incoming packet with priority indicated by the value (i).

3. The method according to claim 2, wherein N+1 values of the scheduling priority SchedP(i,t) are calculated, SchedP$_1$(i,t), SchedP$_2$(i,t), . . . , SchedP$_N$(i,t), SchedP$_{N+1}$(i,t), being each of the values determined respectively by a weight, SPIweight$_1$(i), SPIweight$_2$(i), . . . , SPIweight$_N$(i), SPIweight$_{N+1}$(i), which indicates a relative priority between users and is given for the delay t$_d$ of the incoming packet as follows:
   If T$_1$(i)>t$_d$>0, SPIweight$_1$(i) is used for calculating SchedP$_1$(i,t);
   If T$_2$(i)>t$_d$≥T$_1$(i), SPIweight$_2$(i) is used for calculating SchedP$_2$(i,t); . . .
   If T$_N$(i)>t$_d$≥T$_{N+1}$(i), SPIweight$_N$(i) is used for calculating SchedP$_N$(i,t);
   If t$_d$≥T$_N$(i), SPIweight$_{N+1}$(i) is used for calculating SchedP$_{N+1}$(i,t).

4. The method according to claim 3, wherein the, at least one, value SchedP$_j$(i,t) of the scheduling priority is calculated as:

$$SchedP_j(i, t) = \frac{R_i(t)}{r_i(t)} * SPIweight_j(i); \quad j = 1, 2, ..., N+1;$$

where $R_i(t)$ is an instant reachable rate determined by a Channel Quality Indicator, $r_i(t)$ is an scheduling rate and t is the current scheduling time.

5. The method according to claim 2, wherein N=3.

6. The method according to claim 1, wherein the packets are scheduled in an order from higher to lower values of the scheduling priority SchedP(i,t).

7. The method according to claim 1, wherein the value (i) refers to a priority indicated by a scheduling priority indicator which is used for scheduling handling in a third generation base station (Node-B).

8. The method according to claim 1, further comprising: stamping the incoming packet with the arrival time at the base station.

9. A base station comprising a scheduler of traffic to be transmitted on a channel, the scheduler comprising:
   a) means for determining a delay $t_d$ of each incoming packet, wherein the delay $t_d$ of the incoming packet is calculated using an arrival time of the incoming packet at the base station and a current scheduling time t, the arrival time being associated with an ID for the incoming packet and being used to dynamically create a table of arrival times;
   b) means for calculating at a current scheduling time t at least one value of a scheduling priority SchedP(i,t) the scheduling priority SchedP(i,t) being a function of a value (i) indicating the priority of the incoming packet and the delay $t_d$ of each incoming packet; and
   c) scheduling means for scheduling the packets buffered in priority queues according to the values of the scheduling priority SchedP(i,t).

10. The base station as claimed in claim 9, wherein the determining means is operable to determine a delay $t_d$ every transmission time interval.

11. The base station as claimed in claim 9, wherein the means for calculating is operable to calculate at least one value of a scheduling priority SchedP(i,t) a delay $t_d$ every transmission time interval.

12. The base station as claimed in claim 9, wherein the scheduling means is operable to schedule the packets buffered in priority queues every transmission time interval.

13. A method for scheduling traffic in wide area cellular telephone networks supporting the High-Speed Downlink Packet Access, wherein traffic containing packets related to users are buffered in priority queues according to a value (i) which indicates a priority for transmission assigned to an incoming packet, the method comprising:
   a) determining a delay $t_d$ of the incoming packet;
   b) calculating at a current scheduling time t at least one value of a scheduling priority SchedP(i,t), the scheduling priority SchedP(i,t) being a function of the value (i) indicating the priority of the incoming packet and the delay $t_d$ of the incoming packet;
   c) scheduling the packets buffered in the priority queues according to the values of the scheduling priority SchedP(i,t),
   d) defining N≥1 time instants $(T_1(i), T_2(i), \ldots, T_N(i))$ for each value (i) indicating the priority of the incoming packet, wherein $T_N(i) > \ldots > T_2(i) > T_1(i) > 0$, being $T_1(i)$ a minimum acceptable delay and $T_N(i)$ a maximum acceptable delay for the incoming packet with priority indicated by the value (i), and
   wherein the steps a), b) and c) are performed every transmission time interval.

14. The method according to claim 13, wherein N+1 values of the scheduling priority SchedP(i,t) are calculated, $SchedP_1(i,t), SchedP_2(i,t), \ldots, SchedP_N(i,t), SchedP_{N+1}(i,t)$, being each of the values determined respectively by a weight, $SPIweight_1(i), SPIweight_2(i), \ldots, SPIweight_N(i), SPIweight_{N+1}(i)$, which indicates a relative priority between users and is given for the delay $t_d$ of the incoming packet as follows:
   If $T_1(i) > t_d > 0$, $SPIweight_1(i)$ is used for calculating $SchedP_1(i,t)$;
   If $T_2(i) > t_d \geq T_1(i)$, $SPIweight_2(i)$ is used for calculating $SchedP_2(i,t); \ldots$
   If $T_N(i) > t_d \geq T_{N-1}(i)$, $SPIweight_N(i)$ is used for calculating $SchedP_N(i,t)$;
   If $t_d \geq T_N(i)$, $SPIweight_{N+1}(i)$ is used for calculating $SchedP_{N+1}(i,t)$.

15. The method according to claim 14, wherein the, at least one, value $SchedP_j(i,t)$ of the scheduling priority is calculated as:

$$SchedP_j(i, t) = \frac{R_i(t)}{r_i(t)} * SPIweight_j(i); j = 1, 2, \ldots, N+1;$$

where $R_i(t)$ is an instant reachable rate determined by a Channel Quality Indicator, $r_i(t)$ is an scheduling rate and t is the current scheduling time.

16. The method according to claim 13, wherein N=3.

17. The method according to claim 13, wherein the packets are scheduled in an order from higher to lower values of the scheduling priority SchedP(i,t).

18. The method according to claim 13, wherein the value (i) refers to a priority indicated by a scheduling priority indicator which is used for scheduling handling in a third generation base station (Node-B).

19. The method according to claim 13, further comprising: stamping the incoming packet with an arrival time at a base station (Node-B) and wherein the delay $t_d$ of the incoming packet is calculated using the arrival time and the current scheduling time t.

* * * * *